United States Patent
White

(10) Patent No.: US 7,150,395 B1
(45) Date of Patent: Dec. 19, 2006

(54) METHOD OF IDENTIFYING ITEMS FOR CHECKOUT

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/944,603

(22) Filed: Sep. 17, 2004

(51) Int. Cl.
*G06K 15/00* (2006.01)

(52) U.S. Cl. .................................... 235/383

(58) Field of Classification Search ............... 235/383, 235/462.46; 705/28
See application file for complete search history.

(56) References Cited

U.S. PATENT DOCUMENTS 5,239,167 A * 8/1993 Kipp ........................ 235/383
6,592,038 B1 * 7/2003 Goodwin, III ......... 235/462.46
6,598,791 B1 * 7/2003 Bellis et al. ................ 235/383
2004/0133484 A1 * 7/2004 Kreiner et al. ................ 705/28

* cited by examiner

Primary Examiner—Thien M. Le
Assistant Examiner—Tae W. Kim
(74) Attorney, Agent, or Firm—Paul W. Martin

(57) ABSTRACT

A method of identifying items for checkout that improves checkout speed. The method includes obtaining first item identification information from RFID labels on grouped first items, obtaining second item identification information from bar code labels on ungrouped second items, determining prices of the first and second items from the first and second item identification information, and processing payment for the first and second items.

14 Claims, 3 Drawing Sheets

METHOD OF IDENTIFYING ITEMS FOR CHECKOUT

BACKGROUND OF THE INVENTION

The present invention relates to checkout methods and more specifically to a method of identifying items for checkout.

Retailers are concerned with checkout speed. One factor that affects checkout speed is product labeling. Items with radio frequency identification (RFID) labels may be identified as a group. Items with bar code labels must be handled individually.

Therefore, it would be desirable to provide a method of identifying items for checkout that improves checkout speed.

SUMMARY OF THE INVENTION

In accordance with the teachings of the present invention, a method of identifying items for checkout is provided.

The method includes obtaining first item identification information from RFID labels on grouped first items, obtaining second item identification information from bar code labels on ungrouped second items, determining prices of the first and second items from the first and second item identification information, and processing payment for the first and second items.

It is accordingly an object of the present invention to provide a method of identifying items for checkout.

It is another object of the present invention to provide a method of identifying items for checkout that improves checkout speed.

BRIEF DESCRIPTION OF THE DRAWINGS

Additional benefits and advantages of the present invention will become apparent to those skilled in the art to which this invention relates from the subsequent description of embodiments and the appended claims, taken in conjunction with the accompanying drawings, in which:

DETAILED DESCRIPTION

Figure 1:
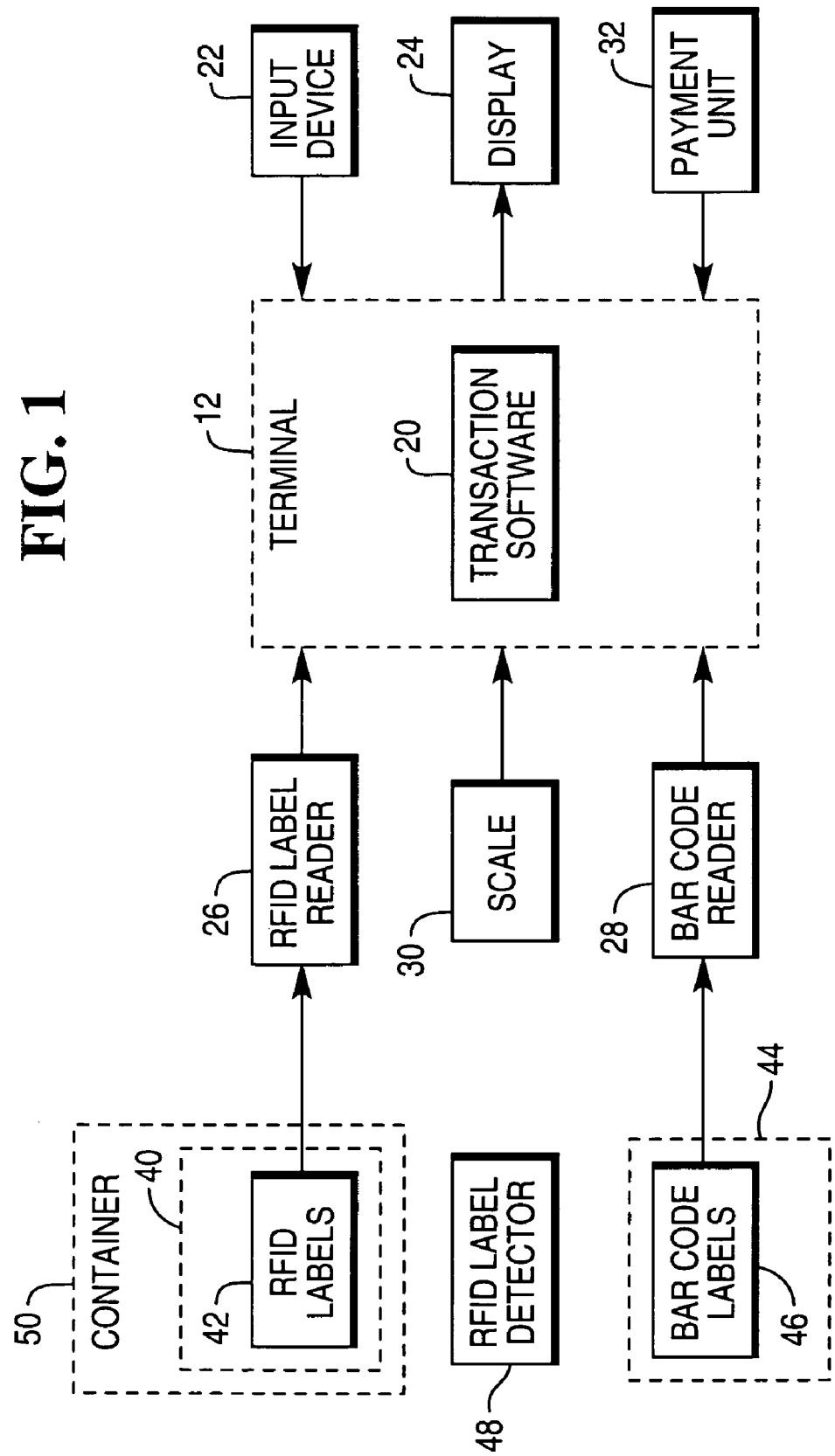
FIG. 1 is a block diagram illustrating a first embodiment of a transaction system.
Figure 2:
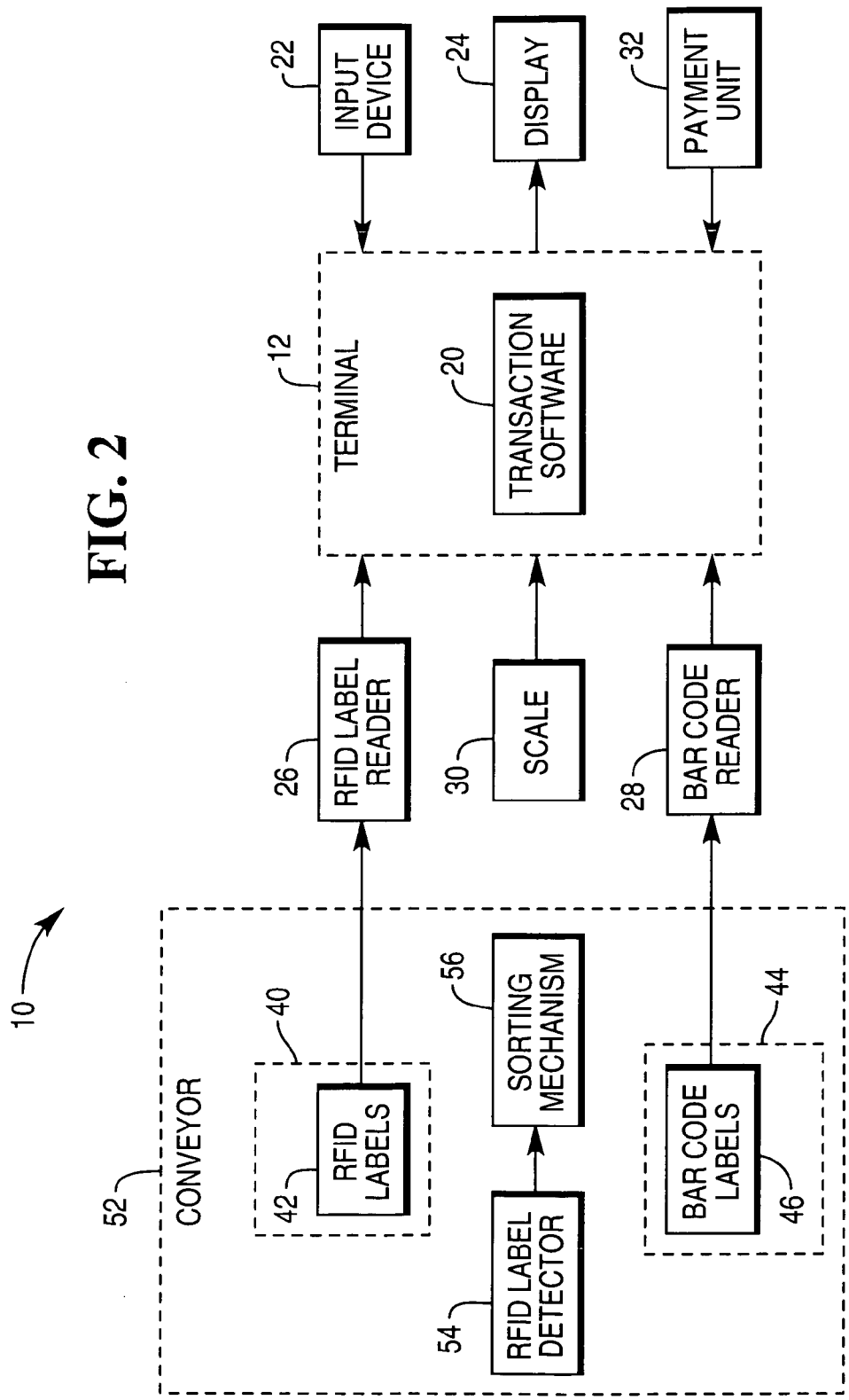
FIG. 2 is a block diagram illustrating a second embodiment of the transaction system.

Referring now to FIGS. 1 and 2, transaction system 10 includes transaction terminal 12.

Transaction terminal 12 executes transaction software 20, which identifies items to be purchased, obtains prices of the items, and processes payment for the items. Transaction terminal 12 may include a self-service or assisted service checkout terminal.

Transaction terminal 12 may include a number of peripherals for completing transactions, including input device 22, display 24, radio frequency identification (RFID) label reader 26, bar code reader 28, scale 30, and payment unit 32.

Input device 22 records operator selections.

Display 24 displays information generated by transaction software 20 necessary to operate terminal 12. Display 24 and input device 22 may be combined as a touch screen.

RFID label reader 26 reads RFID labels 42 on items 40 to obtain item identification information.

RFID labels 42 may be visible or hidden when attached to items 40. RFID labels 42 may be active or passive RFID labels. RFID label reader 26 may either obtain item and container identification information directly from RFID labels 42, or from the associated databases. In the latter case, RFID label reader 26 obtains a unique signature from RFID labels 42, which transaction software 20 compares to a table of item identifications to identify items 40. The table of item identifications may be part of a price look-up database or be a separate database.

Bar code reader 28 reads bar code labels 46 on items 44 to obtain item identification information. Items 40 may also include bar code labels 46.

In either case, transaction software 20 obtains price information associated with the identification information from a price database.

Scale 30 determines weight information of items 40, 44, or both, and may also act as a produce scale. In self-checkout systems, transaction software may provide security against theft by comparing the weight information obtained from items 40 and 44 with reference weight information associated with items 40 and 44.

Payment unit 32 accepts payment for items 40 and 44. Payment unit 32 may include a card reader, cash acceptor, cash dispenser, or a combination thereof.

Under one embodiment of the present invention (FIG. 1), items 40 are grouped into container 50 before checkout at terminal 12. Customers may sort and group items 40 as they shop. Items 40, 44, or both may be marked with visual indicia to aid in sorting. Alternately, customers may use RFID label detector 48 to indicate the presence or lack of RFID labels 42 as items 40 and 44 are sorted.

Examples of container 50 include a shopping cart, grocery bag, or box.

RFID label reader 26 reads all RFID labels 42 while items 40 remain in container 50. Transaction software 20 displays an indication to the operator whether all items 40 were processed and whether any were missed that would require reading by bar code reader 28. Some of items 40 may fail to be processed due to failed or poorly readable RFID labels 42. If so, an operator may empty the bag, determine the item 40 that could not be identified, and read a bar code label on the previously unidentified item.

Items 44 are not placed in containers, or items 44 are removed from any such containers to be identified by bar code reader 28. Bar code reader 28 reads bar code labels 46 on items 44 as they are individually handled to obtain item identification information.

Under this embodiment, items 40 may remain in container 50 during processing by terminal 12.

Under another embodiment of the present invention (FIG. 2), items 40 and 44 are placed on a conveyor and sorted. Items 40 are placed on one area of conveyor 52 and items 44 are placed on a different area of conveyor 52. Alternately, conveyor 52 may include sorting mechanism 56 for automatically diverting items 44, as well as any items 40 that have damaged or inoperable RFID tags, to an area for hand scanning based upon a lack of received identification information from RFID label reader 26. Conveyor 52 may be Y-shaped.

RFID reader 26, or an RFID label detector 54, may be used to separate items 40 from items 44. Items 40, 44, or both may be marked with visual indicia to aid in sorting. RFID label detector 54 may be controlled by transaction software 20.

RFID label reader 26 reads all RFID labels 42 as a group, without requiring separate handling, after items 40 have been separated from items 44. Transaction software 20 displays an indication to the operator whether all items 40 have been processed and whether any were missed that would require reading by bar code reader 28.

Bar code reader 28 reads bar code labels 46 on items 44 as they are individually handled to obtain item identification information.

Figure 3:
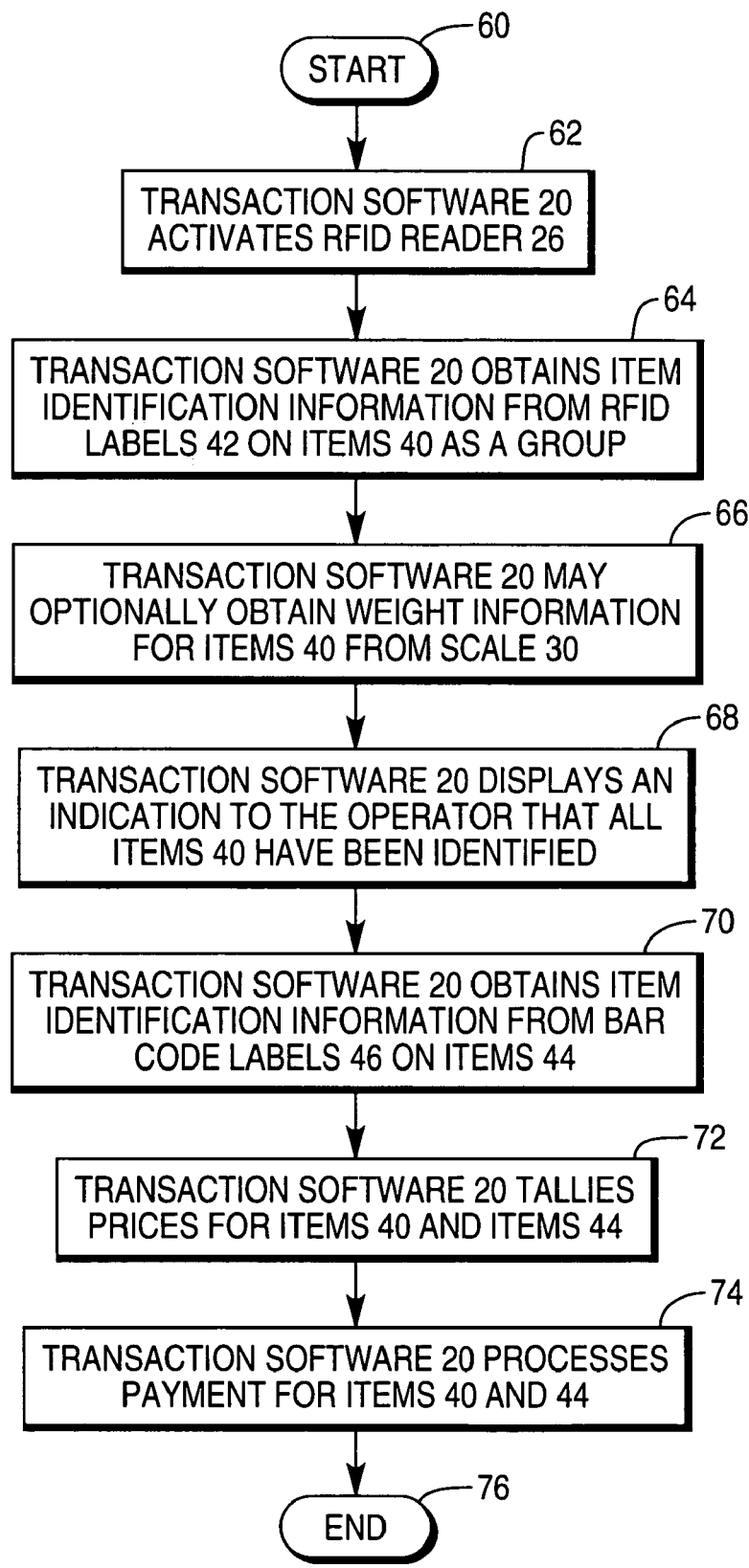
FIG. 3 is a flow diagram illustrating operation of transaction software of the transaction system.

With reference to FIG. 3, operation of transaction software 20 is illustrated in detail, starting with Start 60.

In step 62, transaction software 20 activates RFID reader 26.

In step 64, transaction software 20 obtains item identification information from RFID labels 42 on items 40 as a group. Items 40 are preferably located together and separated from items 44 for this purpose. Items 40 may be located in container 50.

In step 66, transaction software 20 may optionally obtain weight information for items 40 from scale 30. Transaction software 20 may then compare the scale weight to a sum of individual reference weights for items 40 for security.

In step 68, transaction software 20 displays an indication to the operator that all items 40 have been identified. If one or more items 40 were not identified, the operator may use bar code reader 28 to read a bar code label on the items 40. An operator may then move items 40 to a bagging area.

In step 70, transaction software 20 obtains item identification information from bar code labels 46 on items 44. An operator must individually handle items 44 in order to use bar code reader 28 to identify items 44. After each item 44 is read by bar code reader 28, an operator may move each item 44 to a bagging area.

In step 72, transaction software 20 tallies prices for items 40 and items 44.

In step 74, transaction software 20 processes payment for items 40 and 44. The customer may then gather items 40 and 44. If items 40 are already in container 50, the customer need only bag items 44.

In step 76, operation ends.

Advantageously, sorting items 40 and 44 prior to checkout speeds checkout since items 40 may be processed as a group, rather than individually.

Although the invention has been described with particular reference to certain embodiments thereof, variations and modifications of the present invention can be effected within the spirit and scope of the following claims.

What is claimed is:

1. A method of identifying items for checkout comprising:
a) physically separating first items from second items into a group;
b) obtaining first item identification information from RFID labels on grouped first items;
c) obtaining second item identification information from bar code labels on ungrouped second items as the ungrouped second items are individually handled by an operator;
d) determining prices of the first and second items from the first and second item identification information; and
e) processing payment for the first and second items.

2. The method of claim 1, wherein step b) comprises:
b-1) obtaining the first item identification information from the RFID labels on the grouped first items while the grouped first items are in a container.

3. The method of claim 1, further comprising:
f) obtaining third item identification information from bar code labels on third items of the first items whose RFID labels failed as the third items are individually handled by the operator.

4. The method of claim 1, further comprising:
f) displaying an indication to the operator that the first items have been identified following step b).

5. The method of claim 1, further comprising:
f) obtaining weight information for the first items from a scale; and g) compare the weight information to reference weight information.

6. The method of claim 5, wherein step e) comprises
e-1) processing payment for the first items if the weight information is within a predetermined threshold of reference weight information.

7. The method of claim 1, wherein step a) comprises:
a-1) detecting the RFID labels on the first items; and
a-2) automatically physically separating the first items from the second items.

8. A checkout system comprising:
an RFID label reader for reading first item identification information from RFID labels on first grouped items that are physically separated from ungrouped second items;
a bar code label reader for individually reading bar code labels on the ungrouped second items to obtain second identification information; and
a computer for obtaining the first item identification information from the RFID label reader, for obtaining the second item identification information from the bar code label reader as the ungrouped second items are individually handled by an operator, for determining prices of the grouped first items and the ungrouped second items from the first and second item identification information, and for processing payment for the grouped first items and the ungrouped second items.

9. The system of claim 8, wherein the RFID label reader reads the first item identification information from the RFID labels on the grouped first items while the grouped first items are in a container.

10. The system of claim 8, wherein the bar code label reader individually reads third item identification information from bar code labels on third items of the first grouped items having unreadable RFID labels as the third items are individually handled by the operator.

11. The system of claim 8, wherein the computer displays an indication to the operator that the grouped first items have been identified following obtaining of the first item identification information.

12. The system of claim 8, wherein the RFID label reader is associated with a conveyor.

13. The system of claim 12, further comprising:
a sorting mechanism on the conveyor for automatically separating items with detected RFID labels into the grouped first items.

14. A checkout system comprising:
an RFID label reader for determining first items with RFID labels in a container and second items without RFID labels in the container, and for reading the RFID labels on the first items to obtain first identification information while the first items remain in the container following physical separation of the second items from the container;
a bar code label reader for individually reading bar code labels on the second items after removal of the second items from the container to obtain second identification information; and
a computer for obtaining the first item identification information from the RFID label reader, for obtaining the second item identification information from the bar code label reader as the second items are individually handled by an operator, for determining prices of the first items and the second items from the first and second item identification information, and for processing payment for the first items and the second items.

* * * * *